W. S. BIDLE.
TIRE TOOL.
APPLICATION FILED MAY 13, 1914.

1,132,153.

Patented Mar. 16, 1915.

Witnesses:
H. J. Gettins.
B. C. Brown.

Inventor:
William S. Bidle
By
His Attorneys.

UNITED STATES PATENT OFFICE.

WILLIAM S. BIDLE, OF CLEVELAND, OHIO, ASSIGNOR TO THE W. S. BIDLE COMPANY, OF CLEVELAND, OHIO, A CORPORATION OF OHIO.

TIRE-TOOL.

1,132,153. Specification of Letters Patent. Patented Mar. 16, 1915.

Application filed May 13, 1914. Serial No. 838,268.

*To all whom it may concern:*

Be it known that I, WILLIAM S. BIDLE, a citizen of the United States of America, residing at Cleveland, in the county of Cuyahoga and State of Ohio, have invented certain new and useful Improvements in Tire-Tools; and I hereby declare the following to be a full, clear, and exact description of the invention, such as will enable others skilled in the art to which it pertains to make and use the same.

This invention relates to improvements in tire tools, and this invention consists essentially in a simple and durable tool having the meritorious features of configuration hereinafter described, pointed out in the claims, and illustrated in the accompanying drawings.

Figure 1:
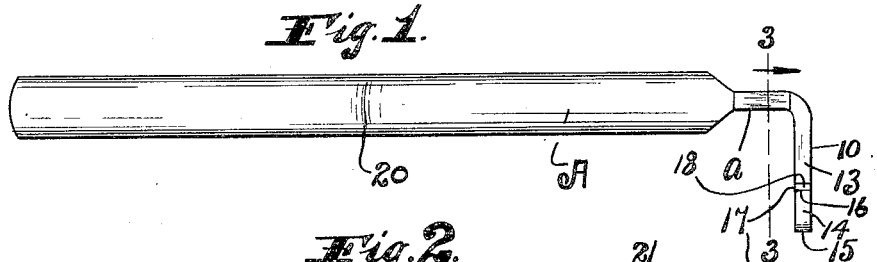
Figure 2:
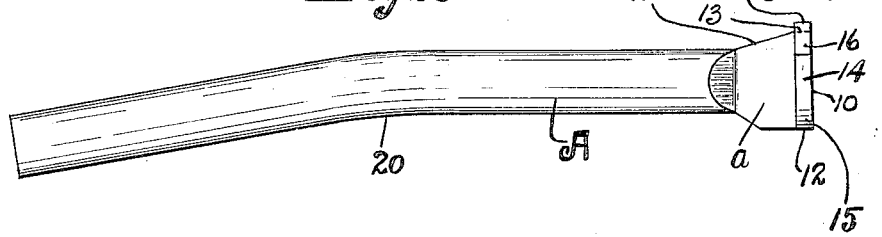
Figure 3:
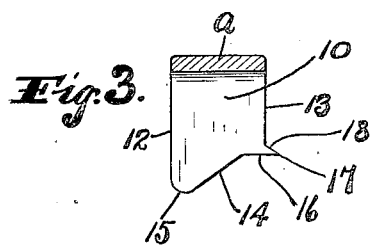
Figure 4:
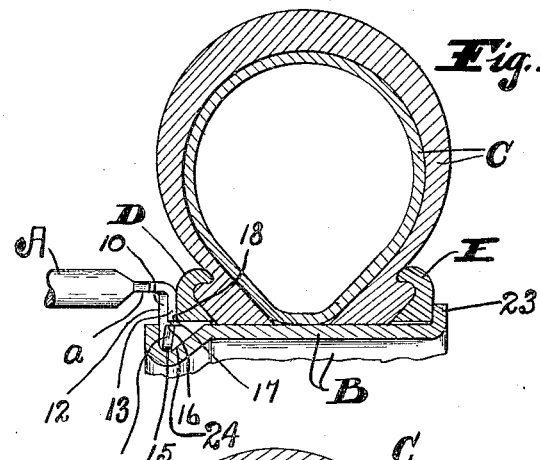
Figure 6:
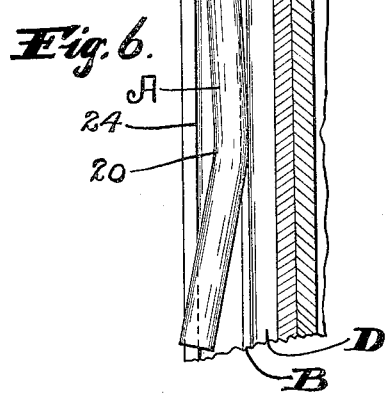
Figure 5:
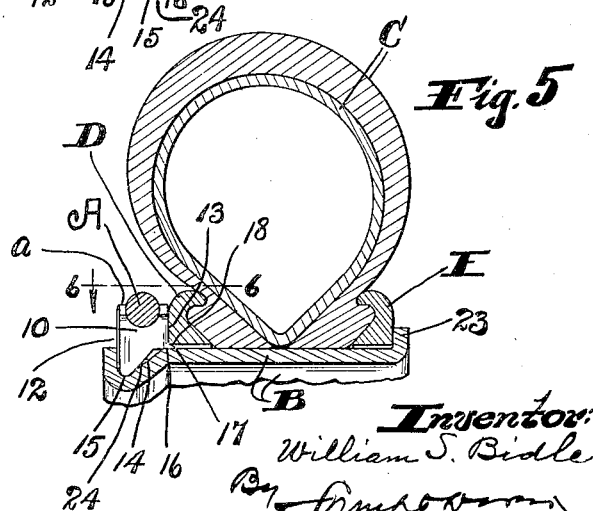

In said drawings, Figure 1 is a side view of a tool embodying my invention. Fig. 2 is a bottom plan relative to Fig. 1. Fig. 3 is a transverse section on line 3—3, Fig. 1, looking forwardly. Figs. 4, 5 and 6 are views illustrating the application and operation of my improved device. Figs. 4 and 5 show the rim of a vehicle-wheel, the tire and the detachable flanges in transverse section. Fig. 6 is a section taken along the line 6—6, Fig. 5. Figs. 4, 5 and 6 are drawn on the same scale but on a scale smaller than Figs. 1 and 2 which illustrate a full-sized tool.

Upon reference to Figs. 1 and 2 of the drawings it will be observed that my improved tool has a shank A which terminates at one end in a head having a flat body-portion *a* arranged in line endwise with the shank A. Said head is provided at the forward end of its body-portion *a* with a flat arm 10 which projects from and is arranged substantially at a right angle to said body-portion. The arm 10 has opposite sides thereof facing forwardly and rearwardly respectively. It will be observed therefore that the arm 10 is arranged adjacent one end of and substantially at a right angle to the shank A. The arm 10 extends from side edge to side edge of the body-portion *a* of the head and is provided with two substantially parallel side edges 12 and 13 extending from said body-portion *a*,—that is, from the inner end of the arm,—but the edge 12 is longer and consequently extends farther from said body-portion than the edge 13. The arm 10 is provided with an inclined edge 14 extending between the outer ends of the side edges 12 and 13. The arm 10 is rounded, as at 15, between said inclined edge and the longer side edge 12. The arm 10 is provided at the inner end of the inclined edge 14,—that is, adjacent the outer end of the shorter side edge 13,—with a shoulder 16 which faces in the direction of the outer or free extremity of the arm. The shoulder 16 is arranged substantially parallel with the body-portion *a* of the head.

It will be observed that the shoulder 16 extends from a point between the side edges 12 and 13 in the direction of and beyond the shorter side edge 13, and the outer portion of said shoulder forms one surface of a lug 17 which is formed on the arm 10 at the outer end of the shorter side edge 13 and projects from said side edge in the direction in which said edge faces, and the opposite surface 18 of said lug is inclined and extends from the outer end of the shoulder or surface 16 to said side edge. It will be observed therefore that the arm 10 is widest at the shoulder 16 and is gradually reduced in width from said shoulder in the direction of the outer or free extremity of the arm, and the shank A is bent, as at 20, substantially at a point centrally between its ends in the direction in which the longer side edge 12 of the arm 10 faces. The body-portion *a* of the head is widest at its forward end, and the width of said body-portion at said end measures more than the thickness of the shank A, and the arm 10 is as wide at its inner end, as already hereinbefore indicated, as the forward end of said body-portion of the head. The body-portion *a* of the head is preferably gradually reduced in width toward its rear end, and said body-portion has its edge 21 which extends from the shank A to the shorter side edge 13 of the arm 10 arranged at an angle to the forward portion of the shank and substantially parallel with the rear portion of the shank.

Referring to Figs. 4, 5 and 6, B indicates a portion of the metal rim of a vehicle-wheel, and C, a portion of an elastic and compressible pneumatic tire mounted on said rim and held to the rim by the usual detachable flanges D and E which are arranged at opposite sides respectively of the tire and extend circumferentially of the wheel-rim. The wheel-rim B is provided at one side with an outwardly projecting circumferentially extending flange 23, and the detachable flange E is interposed between said flange and the tire C, and said wheel-rim is provided at its opposite side and outer circumferential surface with a circumferentially extending channel or recess 24 adapted to be engaged by the usual split locking ring (not shown) employed in locking the detachable flange D in place on the wheel-rim,—that is, in preventing outward displacement of the last mentioned flange when the latter is in its normal position (not shown).

It will be observed that my improved tool is applied, as shown in Fig. 4, in which the shank A extends laterally of and outwardly from the detachable flange D and the arm 10 of the head of the tool projects into the channel or recess 24 and abuts at its forward side against the outer side of said flange D and its rear side against the outer side wall of said recess, and the tool is furthermore so positioned relative to said flange that the sloping or inclined surface 18 of the lug 17 of said arm slightly overlaps the internal circumferential surface of said flange, as shown in Fig. 4, and thereupon the tool is manipulated as required to cause the arm 10 to displace said flange inwardly far enough to permit the interposition of said arm edgewise between said flange and the outer side wall of said recess, as shown in Figs. 5 and 6, so that the rear side of said arm overlaps said wall while the forward side of the arm abuts against the outer side of said flange.

It will be observed that the outer side wall of the recess 24 in the wheel-rim B serves as an abutment for the arm 10 during the actuation of the tool from the position shown in Fig. 4 into the position shown in Figs. 5 and 6. My improved tool is applied at several points successively circumferentially of the wheel-rim, but said tool upon displacing the detachable flange D, as shown in Fig. 5, at any one of said points, is not removed from one to another of said points until said ring and the tire and the detachable flange E are held to the flange 23 of the wheel-rim by a suitable clamp or device (not shown) applied adjacent the point at which the flange D has been and is held displaced inwardly by the arm 10. The arm 10 extends far enough transversely of the body-portion a of the head to cause said arm during the movement of the tool from the position shown in Fig. 4 into the position shown in Figs. 5 and 6 to displace the detachable flange D far enough inwardly to permit the reception by the channel or recess 24 of the split locking ring (not shown) to be interposed between the outer side of said flange and the outer side wall of said recess.

It will be observed, upon reference to Fig. 6, that the bending of the shank A at a suitable point rearwardly of the head of the tool in the direction in which the longer side edge 12 of the arm 10 faces and the arrangement of the side edge 21 of the body-portion a of said head at the angle shown relative to the forward portion of the shank A renders the tool capable, upon swinging it from the position shown in Fig. 4 into the position shown in Figs. 5 and 6, of abutting against the detachable flange D only at the bend in the shank of the tool so that the forward portion and rear portion of said shank are arranged at an angle to and diverge from said side of said flange, as shown in Fig. 6, and the head of the tool only abuts at the shorter side edge 13 of its arm 10 against said flange. It will be observed also that the hereinbefore described bend in the shank of the tool and the hereinbefore described arrangement of the side edge 21 of the body-portion a of the head of the tool relative to said shank permit such a manipulation of the tool that the arm 10 has been moved far enough during the actuation of the tool from the position shown in Fig. 4 into the position shown in Figs. 5 and 6 to prevent swinging of the tool out of the position shown in Figs. 5 and 6 by the pressure of the detachable flange D against the shank of the tool.

What I claim is:—

1. A device of the character indicated having a shank and an arm which is arranged adjacent one end of and at an angle to the shank and has two sides facing forwardly and rearwardly respectively, said arm being provided at one side edge thereof and a suitable distance from the inner end of the arm with a shoulder facing in the direction of and spaced from the outer extremity of the arm.

2. A device of the character indicated having a shank and an arm which is arranged adjacent one end of and at an angle to the shank and has two sides facing forwardly and rearwardly respectively and two side edges of unequal length extending from the inner end of the arm, which arm is provided with a shoulder facing in the direction of the outer extremity of the arm, which shoulder extends from a point between the aforesaid edges in the direction in which the shorter edge faces, said arm being reduced in width from said shoulder toward the outer extremity of the arm.

3. A device of the character indicated having a shank and an arm which is arranged adjacent one end of and at an angle to the shank and has two sides facing forwardly and rearwardly respectively, which arm is provided with a lug arranged between the inner and outer ends of the arm and projecting in the direction in which one side edge of the arm faces, one surface of said lug facing in the direction of the outer extremity of the arm and the opposite surface of said lug being inclined and facing in the direction in which the aforesaid edge faces and in the direction of the inner end of the arm and extending from the first-mentioned surface toward said edge.

4. A device of the character indicated having a shank and an arm which is arranged adjacent one end of and at an angle to the shank and has two sides facing forwardly and rearwardly respectively and two side edges of unequal length extending from the inner end of the arm, which arm is provided with a lug arranged at the outer end of the shorter side edge and projecting in the direction in which said edge faces, one surface of said lug facing in the direction of the outer extremity of the arm and the opposite surface of said lug being inclined and facing in the direction in which said last-mentioned edge faces and in the direction of the inner end of the arm and extending from the first-mentioned surface toward said last-mentioned edge.

5. A device of the character indicated having a shank and an arm which is arranged adjacent one end of and substantially at a right angle to the shank and has two sides facing forwardly and rearwardly respectively and two substantially parallel side edges of unequal length extending from the inner end of the arm, which arm is provided adjacent the outer end of the shorter side edge with a shoulder facing in the direction of the outer extremity of the arm and extending from a point between said side edges in the direction in which the shorter side edge faces, said arm being provided at the inner end of the shorter side edge with a lug projecting from said edge in the direction in which said edge faces, the aforesaid shoulder forming one surface of said lug and the opposite surface of said lug being inclined and facing in the last-mentioned direction and in the direction of the inner end of the arm and extending from the shoulder toward the last-mentioned edge.

In testimony whereof, I sign the foregoing specification, in the presence of two witnesses.

WILLIAM S. BIDLE.

Witnesses:
B. C. BROWN,
HERBERT C. WOOD.